United States Patent
Song et al.

(10) Patent No.: US 8,552,100 B2
(45) Date of Patent: Oct. 8, 2013

(54) FLEXIBLE HYDROGEL-BASED FUNCTIONAL COMPOSITE MATERIALS

(75) Inventors: Jie Song, Shrewsbury, MA (US);
Eduardo Saiz, Berkeley, CA (US);
Carolyn R. Bertozzi, Berkeley, CA (US); Antoni P. Tomsia, Pinole, CA (US)

(73) Assignee: The Regents of the University of California, Oakland, CA (US)

( * ) Notice: Subject to any disclaimer, the term of this patent is extended or adjusted under 35 U.S.C. 154(b) by 896 days.

(21) Appl. No.: 11/817,016

(22) PCT Filed: Feb. 22, 2006

(86) PCT No.: PCT/US2006/006243
§ 371 (c)(1),
(2), (4) Date: Aug. 23, 2007

(87) PCT Pub. No.: WO2006/091653
PCT Pub. Date: Aug. 31, 2006

(65) Prior Publication Data
US 2008/0275171 A1 Nov. 6, 2008

Related U.S. Application Data

(60) Provisional application No. 60/655,986, filed on Feb. 23, 2005.

(51) Int. Cl.
*C08K 3/32* (2006.01)
*C08K 3/22* (2006.01)
*C08K 3/08* (2006.01)

(52) U.S. Cl.
USPC ........... 524/417; 524/414; 524/401; 524/436; 524/556

(58) Field of Classification Search
USPC .......................... 524/414, 417, 401, 436, 556
See application file for complete search history.

(56) References Cited

U.S. PATENT DOCUMENTS

| | | | |
|---|---|---|---|
| 3,930,076 A * | 12/1975 | Kliment | 427/353 |
| 5,645,592 A * | 7/1997 | Nicolais et al. | 606/63 |
| 6,129,928 A | 10/2000 | Sarangapani et al. | |
| 6,207,218 B1 | 3/2001 | Layrolle et al. | |
| 6,322,728 B1 | 11/2001 | Brodkin | |
| 6,322,895 B1 | 11/2001 | Canham | |
| 6,346,121 B1 | 2/2002 | Hicks et al. | |
| 6,387,414 B1 | 5/2002 | Akashi et al. | |
| 6,395,037 B1 | 5/2002 | Akashi et al. | |
| 6,541,022 B1 | 4/2003 | Murphy et al. | |

(Continued)

FOREIGN PATENT DOCUMENTS

JP 06100410 A * 4/1994

OTHER PUBLICATIONS

JP 06100410 A, Apr. 1994, Saito et al. Derwent AB.*

(Continued)

*Primary Examiner* — Satya Sastri
(74) *Attorney, Agent, or Firm* — Robin C. Chiang; Lawrence Berkeley National Laboratory

(57) ABSTRACT

A composite having a flexible hydrogel polymer formed by mixing an organic phase with an inorganic composition, the organic phase selected from the group consisting of a hydrogel monomer, a crosslinker, a radical initiator, and/or a solvent. A polymerization mixture is formed and polymerized into a desired shape and size.

13 Claims, 8 Drawing Sheets

(56) References Cited

U.S. PATENT DOCUMENTS

| | | | |
|---|---|---|---|
| 7,275,933 B2* | 10/2007 | Jia et al. | 433/228.1 |
| 8,110,212 B2* | 2/2012 | Marcolongo et al. | 424/423 |
| 8,344,042 B2* | 1/2013 | Liu et al. | 523/115 |
| 2001/0008649 A1 | 7/2001 | Layrolle et al. | |
| 2001/0053406 A1 | 12/2001 | Layrolle et al. | |
| 2002/0005600 A1 | 1/2002 | Ma | |
| 2002/0018797 A1 | 2/2002 | Cui et al. | |
| 2002/0031540 A1 | 3/2002 | Miyamoto et al. | |
| 2002/0034646 A1 | 3/2002 | Canham | |
| 2002/2012762 | 9/2002 | Akashi et al. | |
| 2003/0006534 A1 | 1/2003 | Taboas et al. | |

OTHER PUBLICATIONS

Addadi, et al., "Interactions Between Acidic Proteins and Crystals: Stereochemical Requirements in Biomineralization," Proc. Natl. Acad. Sci. USA, vol. 82, pp. 4110-4114, (Mar. 25, 1985).

Aizenberg, et al., "Control of Crystal Nucleation by Patterned Self-Assembled Monolayers," Nature, vol. 398, Macmillan, pp. 495-498, (Apr. 8, 1999).

Aizenberg, et al., "Direct Fabrication of Large Micropatterned Single Crystals," Science, vol. 299, pp. 1205-1208, (Feb. 21, 2003).

Aizenberg, et al., "Oriented Growth of Calcite Controlled by Self-Assembled Monolayers of Functionalized Alkanethiols Supported on Gold and Silver," J. Am. Chem Soc, vol. 121, pp. 4500-4509, (Apr. 4, 1999).

Barrere, et al., "Influence of Ionic Strength and Carbonate on the Ca-P Coating Formation from SBF x 5 Solution," Biomaterials, vol. 23, Elsevier Science, pp. 1921-1930, (2002).

Barrere, et al., "Nucleation of Biomimetic Ca-P Coatings on Ti6A14V from a SBF x 5 Solution: Influence of Magnesium," Biomaterials, vol. 23, Elsevier Science, pp. 2211-2220, (2002).

Berman, et al., "Total Alignment of Calcite At Acidic Polydiacetylene Films: Cooperativity At the Organic-Inorganic Interface," Science, vol. 269, pp. 515-518, (Jul. 28, 1995).

Blendell et al., "High Purity Alumina by Controlled Precipitation From Aluminum Sulfate Solutions," Ceramic Bulletin, vol. 63, Number. 6, American Ceramic Society, pp. 797-802, (1984).

Bradt, et al., "Biomimetic Mineralization of Collagen by Combined Fibril Assembly and Calcium Phosphate Formation," W. Chem. Mater., vol. 11, American Chemical Society, pp. 2694-2701, (Sep. 11, 1999).

Branda, F. et al., "Hydroxyapatite coating of poly(2-hydroxyethyl methacrylate) hydrogel by biomimetic method," J. Materials Sci., 1999, 34, p. 1319-1322.

De Jonghe, et al., "Composite Powder Synthesis," Ceramic Microstructure: Control at the Atomic Level, Eds. Tomisia, et al.; Plenum Press: NY, pp. 559-565, (1998).

Du, C. et al., "Formation of Calcium Phosphate/Collagen Composites Through Mineralization of Collagen Matrix," J.Biomed. Mater. Res., vol. 50, John Wiley & Sons, Inc., pp. 518-527, (2000).

Dupraz, et al., "Characterization of Silane-Treated Hydroxypatite Powders for Use as Filler in Biodegradable Composites," J. Biomed. Mater. Res, vol. 30, John Wiley & Sons, pp. 231-238, (1996).

Gomez-Vega, J.M. et al., "Glass-based coatings for titanium implant alloys," J. Biomed. Mater. Res., 1999, 46, 549-559.

Heywood, et al., "Template-Directed Nucleation and Growth of Inorganic Materials," Advanced Materials, vol. 6, No. 1, pp. 9-20, (Sep. 15, 2004).

Hutmacher, et al., "Scaffolds in Tissue Engineering Bone and Cartilage," Biomaterials, vol. 21, Elsevier Science, pp. 2529-2543, (2000).

Kidane, et al., "Accelerated Study on Lysozyme Deposition on Poly(HEMA) Contact Lenses," Biomaterials, vol. 19, Elsevier Science, pp. 2051-2055, (1998).

Kokubo et al., Apatite Formation on Surfaces of Ceramics, Metals and Polymers in Body Environment, Acta Mater., vol. 46, No. 7, Elsevier Science, 2519-2527, (1998).

Labella, et al., "Novel Hydroxyapatite-Based Dental Composite," S. Biomaterials, vol. 15, No. 15, pp. 1197-1200, (1994).

Lee, et al., "Hydrogels for Tissue Engineering," Chem. Rev., vol. 101, No. 7, American Chemical Society, pp. 1869-1879, (May 31, 2001).

Lesny, et al., "Polymer Hydrogels Usable for Nervous Tissue Repair," Journal of Chemical Neuroanatomy, vol. 23, Elsevier Science B.V., pp. 243-247, (2002).

Liu, et al., "A Study on the Grafting Reaction of Isocyanates with Hydroxyapatite Particles," J.Biomed Mater. Res, Wiley & Sons, vol. 40, pp. 358-364, (1998).

Liu, et al., "Covalent Bonding of PMMA, PBNA and Poly (HEMA) to Hydroxyapatite Particles," J.Biomed Mater. Res,, vol. 40, Wiley & Sons, pp. 257-263, (1998).

Liu, et al., Polyacids as Bonding Agents in Hydroxyapatite Polyester-Ether (Polyactive 30/70) Composites, J. Mater. Sci.-Mater. Med., vol. 9, Chapman & Hall, pp. 23-30, (1998).

Mann, S., Biomineralization: Principles and Concepts in Bioinorganic Materials Chemistry; Oxford University Press: New York, (2001).

Misra, et al., "Adsorption of Zirconyl Salts and Their Acids on Hydroxyapatite: Use of the Salts as Coupling Agents to Dental Polymer Composites," J. Dent. Res., vol. 64, No. 12, pp. 1405-1408, (Dec. 1985).

Miyaji, et al., "Bonelike Apatite Coating on Organic Polymers: Novel Nucleation Process Using Sodium Silicate Solution," Biomaterials, vol. 20, Elsevier Science Ltd., pp. 913-919, (1999).

Miyazaki, et al., "Mechanism of Bonelike Apatite Formation on Bioactive Tantalum Metal in a Simulated Body Fluid," Biomaterials, vol. 23, Elsevier Science, pp. 827-832, (2002).

Murphy, et al., "Bioinspired Growth of Crystalline Carbonate Apatite on Biodegradable Polymer Substrate," J. Am. Chem. Soc., vol. 124, No. 9, pp. 1910-1917, (2002).

Nancollas, et al., "Formation and Dissolution Mechanisms of Calcium Phosphates in Aqueous Systems," Hydroxyapatite and Related Materials, Eds Brown et al.; CRC Press, Inc.: Boca Raton, FL; pp. 73-80, (1994).

Oyane, et al. "Nippon Seramikkusu Kyokai gakujutsu ronbunshi," 110 (4): 248-254, 2002.

Oxley, et al., "Macroporous Hydrogels for Biomedical Applications: Methodology and Morphology," Biomaterials, vol. 14, No. 14, Elsevier Science, pp. 1064-1072, (1993).

Peppas, N. A., "Hydrogels in Medicine and Pharmacy:" vol. II Polymers, CRC Press: Boca Raton, FL, (1986).

Phillips et al., Contact Lenses: A Textbook for Practitioner and Student, 3rd ed., Butterworth & Co: London: (1989).

Prati, et al., "Hydroxyethyl-Methacrylate Dentin Bonding Agents: Shear Bond Strength, Marginal Microleakage and SEM Analysis," Clinical Materials, vol. 8, Elsevier, pp. 137-143, (1991).

Rhee et al., "Effect of Citric Acid on Nucleation of Hydroxyapatite in a Simulated Body Fluid," Biomaterials, vol. 20, Elsevier Science, pp. 2155-2160, (1999).

Song, Jie, et al., "Preparation of pHFMA-CP composites with high interfacial adhesion via template-driven mineralization," Journal of the European Ceramic Society, 2003, 23(15), pp. 2905-2919 (Abstract only).

Taguchi, T. et al., "A study on hydroxyapatite formation on/in the hydroxyl groups-bearing nonionic hydrogels," J. Biomater. Sci. Polymer Adn., 1999, 10(1), p. 19-32.

Tan, "An Overview of PHEMA Properties, Applications, and Future Progress," Biomaterials, pp. 1-3, (Apr. 24, 2000).

Tanahashi, M. et al., "Apatite coated on organic polymers by biomimetic process: Improvement in its adhesion to substrate by NaOH treatment," J. Applied Biomaterials, 1994, 5, p. 339-347.

Vermeiden, et al., "Histological Evaluation of Calcium Hydroxyapatite Bioceramics, Pure and Reinforced with Polyhydroxyethylmethacrylate," Evaluation of Biomaterials; Eds. Winter, et al.; Wiley & Sons: NY; pp. 405-411, (1980).

Wang, et al., "Development of Biomimetic Nano-Hydroxyapatite/poly (Hexamethylene Adipamide) Composites," Biomaterials, vol. 23, Elsevier Science, pp. 4787-4791, (2002).

Weiner, et al., "The Material Bone:Structure-Mechanical Function Relations," Annual Review Mater. Sci., vol. 28, pp. 271-298, (1998).

Yang, et al., "Calorimetric Characterization of the Formation of Acrylic Type Bone Cements," J. Biomed. Mater. Res., vol. 33, Wiley & Sons, pp. 83-88, (1996).

* cited by examiner

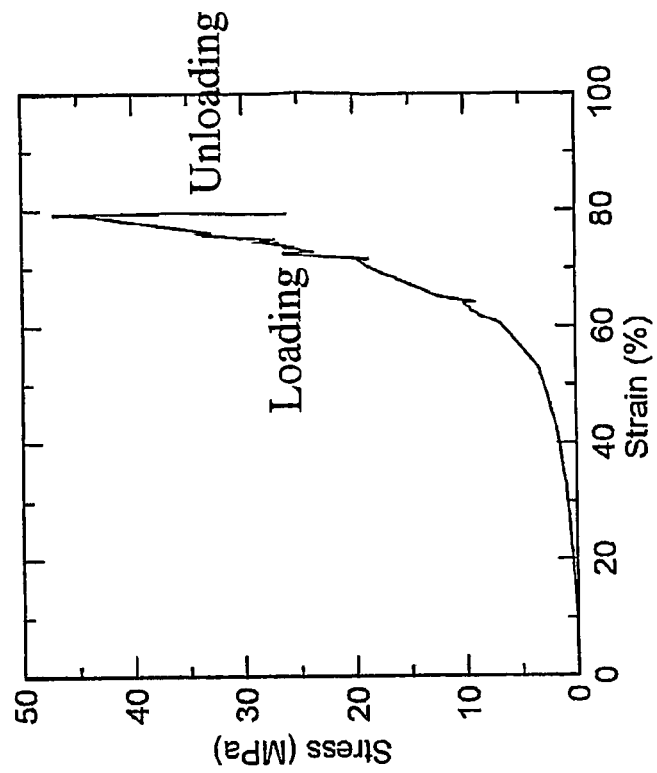
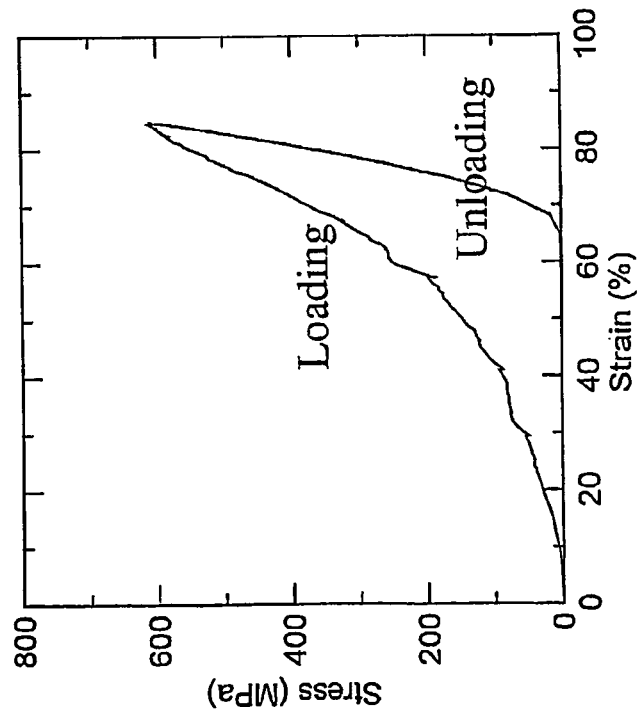
Fig. 4B
Fig. 4A

FLEXIBLE HYDROGEL-BASED FUNCTIONAL COMPOSITE MATERIALS

CROSS-REFERENCE TO RELATED APPLICATIONS

This application claims priority to International Patent Application No. PCT/US2006/006243, filed on Feb. 22, 2006, which claims priority to U.S. Patent Application No. 60/655,986, filed on Feb. 23, 2005, which are hereby incorporated by reference in their entireties. This application also relates to U.S. patent application Ser. No. 10/740,739, filed on Dec. 18, 2003, and U.S. Provisional Patent Application No. 60/631,660, filed on Nov. 29, 2004, which are both hereby incorporated by reference in their entireties.

STATEMENT OF GOVERNMENTAL SUPPORT

This invention was made with government support under Contract DE-AC02-05CH11231 awarded by the United States Department of Energy to The Regents of the University of California for the management and operation of the Lawrence Berkeley National Laboratory and the National Institute of Health Grant No. 5R01DE015633-01. The government has certain rights in this invention.

FIELD OF THE INVENTION

The present invention relates to the field of three-dimensional organic and inorganic bulk composite materials obtained through the use of biocompatible hydrogel scaffolds and various inorganic materials.

BACKGROUND OF THE INVENTION

Poly(2-hydroxyethyl methacrylate), or pHEMA, and its functional derivatives have been the most widely used biocompatible hydrogels in tissue engineering. Existing applications include ophthalmic devices, cartilage replacement, spinal cord injury repair, carriers for drug or growth factor delivery, dental cement or medical sealant, coating for medical devices, and temporary (burnt away eventually) binder for the fabrication of ceramic scaffolds, and the like. However, its application as collagen-mimicking scaffold for artificial bonelike materials have been limited by the lack of an efficient technology to enable high affinity integration of pHEMA with bulk calcium phosphate bioceramics, especially hydroxyapatite (HA). A urea-mediated mineralization method that could lead to high-affinity integration of HA on the surface of pHEMA hydrogel and pHEMA-based hydrogel copolymers has been developed. However, high-affinity integration of HA with pHEMA-based hydrogel at a high mineral-to-gel ratio throughout the 3-D scaffold has not been achieved or reported in literature.

BRIEF DESCRIPTION OF THE INVENTION

A composite having a flexible hydrogel polymer formed by mixing an organic phase with an inorganic composition, the organic phase selected from the group consisting of a hydrogel monomer, a crosslinker, a radical initiator, and/or a solvent. A polymerization mixture is formed and polymerized into a desired shape and size.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 4 are graphs illustrating composite stress-strain curve trends.

DETAILED DESCRIPTION OF THE PREFERRED EMBODIMENTS

Figure 1A:
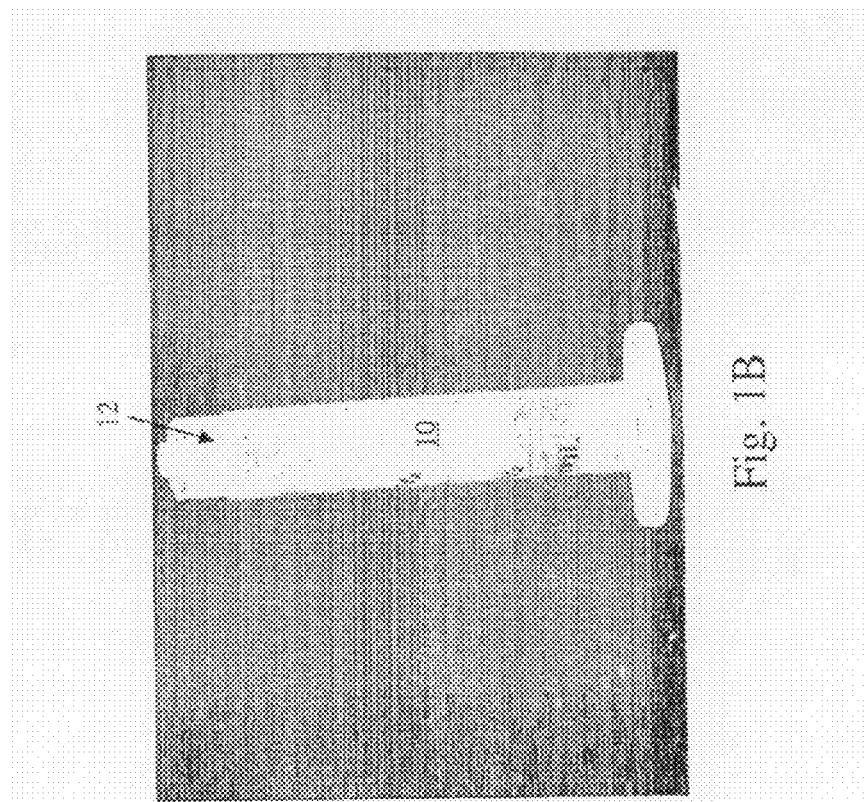
FIG. 1 illustrates the composite placed in a syringe.

Three-dimensional composites are described comprising a flexible hydrogel polymer, wherein the composites have a high inorganic content and strong mechanical properties yet exhibit elastic properties. The composites may be used for various applications calling for a strong yet flexible hybrid material comprised of organic and inorganic components. The organic-to-inorganic ratio can be made wide ranging, allowing the tailoring of the flexibility and stiffness of the composite to suit various needs.

The composites may have an organic-to-inorganic ratio of about 1.0 w/w % to about 99 w/w %, but preferably from about 10 w/w % to about 90 w/w %. In one embodiment, the composites formed have an organic-to-inorganic ratio of about 37 w/w % to about 48 w/w %. By the term "about" it is meant that the following value includes ±5% the stated value. The present invention also describes methods of preparing and forming these three-dimensional composites.

The invention further provides methods for the fabrication of three-dimensional (3-D) bone-like composites, with high mineral content approximating the mineral-to-organic matrix ratio (50-65 w/w %) of dehydrated human bone. In another embodiment, the invention further provides fast and convenient protocols for the fabrication of 3-D poly(hydroxyethyl methacrylate) (pHEMA)—hydroxyapatite (HA) hybrid composite materials for such uses as bone-like composites.

The organic phase and the inorganic phase are mixed together to form a polymerization mixture. The organic phase may be comprised of one or more monomers, crosslinker, radical initiators, and possibly solvents. The inorganic phase may be comprised of inorganic materials including but not limited to glass, ceramic, mineral, metallic or semiconductor particles. The polymerization mixture is shaken thoroughly in the presence of an object capable of mechanically breaking up aggregates, to provide a slurry with even and good consistency. After being mixed sufficiently, the polymerization mixture is transferred to a container or any other mold and polymerized.

A solvent exchange procedure is also described, that allows us to further manipulate the elasticity of the material after it is solidified, primarily by exposing it in water or non-toxic, more viscous solvent (e.g. glycerol) environment.

The crosslinked hydrogel polymer may comprise one or more monomers polymerized with a crosslinker in the presence of an initiator and a suitable solvent. Hydrogel monomers appropriate for the preparation of the composites of the present invention include but are not limited to, methacrylates, methacrylamides, acrylates and acrylamides, and monomers comprising the structure shown in STRUCTURE I: —$(CH_2—CR^2—COXR^1)_n$— wherein $R^1$ may be H or lower alkyl, $R^2$ may be H or lower alkyl, X may be O or NH or S, and n is preferably 10 to 100,000.

In a preferred embodiment the polymer is pHEMA. In another preferred embodiment, $R^1$ is ethyl, $R^2$ is H, and n is 10 to 100,000.

By the term "lower alkyl" it is meant any saturated or unsaturated, branched, unbranched, or cyclic hydrocarbon, or a combination thereof, typically 1 to 20 carbons, and specifically includes methyl, ethyl, propyl, isopropyl, butyl, isobutyl, t-butyl, pentyl, cyclopentyl, isopentyl, neopentyl, hexyl, isohexyl, cyclohexyl, 3-methylpentyl, 2,2-dimethylbutyl, 2,3-dimethylbutyl, heptyl, octyl, nonyl, and decyl.

The crosslinked hydrogel polymer may further comprise 0.0% to 99%, more preferably from 0% to 50%, methacrylate co-monomers or methacrylamide co-monomers. The co-monomer may bear functional groups including, but not limited to, anionic groups, polar ligands, aldehydes, ketones, phosphates, nucleic acids, amino acids, modified or phosphorylated or glycosylated or sulfated amino acids, peptides or proteins, carbohydrates, extracellular matrix components such as collagens and laminins, biodegradable motifs and polyethylene glycols. In one embodiment, co-monomers may be used to incorporate functional groups into the composite that promote bone growth, mineralization, or provide functional groups which promote biocompatibility.

The peptide compositions described in co-pending U.S. Provisional Patent Application No. 60/631,660 may be used as functional groups on the co-monomers in the formation of the present composites to be displayed on or in the composites to promote mineralization. Furthermore, the peptides may be used in conjunction with other known peptides or agents in the art for the promotion of mineralization. For exemplary purposes only and not intended to be limiting, U.S. Pat. No. 6,479,460 and U.S. Pat. No. 5,461,034 disclose synthetic peptides, pseudopeptides, and pharmaceutical compositions having osteogenic activity that may be attached to the co-monomers as functional groups to make the biomimetic composites. Different co-monomers may also be used to control porosity, the concentration of nucleation sites, and other properties.

The hydrogel polymer may further comprise 0.1% to 50% of a crosslinker, more preferably 2% to 10%. In a preferred embodiment, the crosslinker is a compound of STRUCTURE II: $R^3$—$C(CH_2)$—CO—X—$R^4$—X—$C(O)$—$C(CH_2)$—$R^{3'}$, wherein $R^3$ and $R^{3'}$ may be H or a lower alkyl, wherein the number of carbon atoms is preferably less than 10; $R^4$ is [—$(CH_2)_n$—Y[—$(CH_2)_{n'}$—$]_m$, wherein n and n' can be independently from 1 to 10 carbon atoms and m=1 to 500,000. Y may be absent, O, S or NH and X may be a heteroatom of O, S or N. The crosslinker may be selected from the group consisting of diacrylates, diacrylamides, dimethacrylates or dimethacrylamides. In a preferred embodiment, the crosslinker is ethylene glycol dimethacrylate, ethylene glycol dimethacrylamide, or a compound of STRUCTURE II (described above), wherein $R^3$ is $CH_3$, $R^4$ is $CH_2CH_3$ and X is O or N. In one embodiment, crosslinkers may also be used to incorporate functional groups into the composite that promote bone growth or provide functional groups that promote biocompatibility or biodegredation. For example, peptide-containing crosslinkers can act as a substrate for various matrix metalloproteinases or other proteins found in vivo that facilitate biodegradation.

The hydrogel polymer-based composite may be further comprised of an inorganic component. The inorganic content of the composite is defined as the weight percentage of the inorganic component over the sum of the inorganic and organic components in any given flexible composite, and it is calculated using the following equation:

Inorganic content=Weight(inorganic component)/ [Weight(inorganic component)+Weight(hydrogel monomers)+Weight(hydrogel crosslinker)]× 100%

The weight is calculated using the appropriate densities of the monomers and crosslinkers in the organic phase. For example, the weight of HEMA and EGDMA were calculated using the following density values: HEMA (d 1.073 g/mL) and EGDMA (d 1.051 g/mL).

The inorganic component may be comprised of materials that have minimal solubility in the solvent used during polymerization. By "minimal solubility" it is meant that at least more than 90% of the inorganic component remains in a solid state upon interaction with the solvent. One skilled in the art would use a reference such as the *CRC Handbook* to look up the solubilities of the inorganic component in the solvent chosen. For example, if the inorganic component is comprised of hydroxyapatite (HA) and the solvent is water, the solubility of HA in water at neutral condition is approximately log $[Ca^{2+}]$~−4 (in total molar concentration). While HA has high solubility in water at acidic conditions, it has very low solubility at neutral and basic condition. $10^{-4}$ is not considered to be very soluble, which is why HA may be used in the presence of water at neutral pH.

Hydroxyapatite powders may be used for the inorganic component including, but not limited to, commercial polycrystalline HA powders, calcined polycrystalline HA powders, single crystal HA whiskers, HA nanocrystals, and other calcium phosphates (compounds containing Ca, P and O, and possibly C, N, H and additives of F, Cl and Br) including, but not limited to, dicalcium phosphate, tricalcium phosphate, octacalcium phosphate, brushite, dahilite, and hydroxyfluoroapatite. The inorganic component may also comprise Ca, P and O and can further be hydroxylated, carbonated and contain other additives of F, Cl and/or Br. In one embodiment, the inorganic component ratio of Ca to P may be between 0.5 and 4, but more preferably between 1 and 2. In another embodiment, the inorganic component is selected from the group consisting of crystalline, nanocrystalline or amorphous hydroxyapatite, and calcium phosphates that can be further substituted with H, C, N, F, Cl and Br.

The inorganic component may comprise of other materials, including but not limited to ceramics, including oxides and non-oxide ceramics (e.g. $Al_2O_3$, $ZrO_2$, $Si_3N_4$, SiC, ferrites, piezoelectric ceramics such as barium titanate, bioceramics including hydroxyapatite, ceramic superconductors such as YBaCuO), metals and alloys (e.g. Mo, Cu, Ni, stainless steel, Ti6Al4V, Fe—Ni, Co—Cr), glasses including bioactive glasses (e.g. glasses in the Si—Na—Ca—P—O or Si—Na—K—Ca—Mg—P—O systems), and semiconductors including group III, IV, V, VI and VII elements and compounds (e.g. CdS, GaAs, GaP).

These other materials may also be used as the inorganic composition in a similar fashion as hydroxyapatite is used in the Examples described below. Table 1 illustrates representative protocols for in situ preparation of composites with ~37 w/w % HA. As an example, using Protocol 2 listed in Table 1, HA may be replaced by bioactive glass, and mixed thoroughly with the monomer selected.

been determined that the complete exchange of solvent, such as ethylene glycol, with water prior to freeze-drying was difficult of achieve in composites possessing very high HA content (greater than 50%). However, prolonged solvent exchange (greater than one day) and repeated hydration/freeze-drying allowed for a complete exchange.

Figure 9:
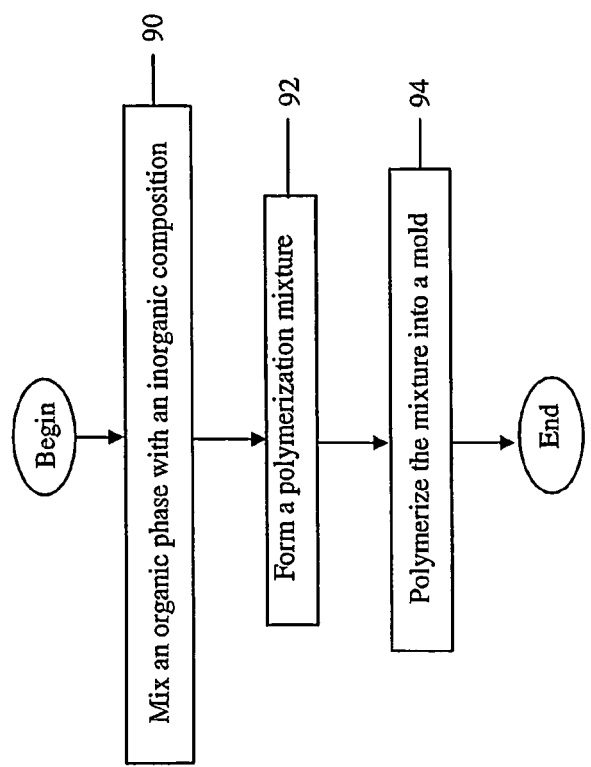
FIG. 9 is a block diagram illustrating a method of forming a flexible composite.

FIG. 9 is a block diagram illustrating a method of forming a flexible composite. The flexible composite may have an organic-to-inorganic ratio of about 1.0 w/w % to about 99 w/w %, and more preferably from about 10 w/w % to about 90 w/w %. An organic phase comprising a hydrogel monomer, crosslinker, radical initiator, highly viscous solvent and/or

TABLE 1

| | | | Composition | | | | |
|---|---|---|---|---|---|---|---|
| Protocol | HEMA, freshly distilled | EGDMA (stored over MS) | Ethylene Glycol | Water | Ammonium persulfate (480 mg/ml, in water) | Sodium metasulfite (180 mg/ml in water) | HA (commercial, calcined, or whisker) |
| 1 | 2 mL | 40 μL | 1.1 mL | N/A | 200 μL | 200 μL | 1.3 g |
| 2 | 2 mL | 40 μL | 400 μL | 750 μL | 200 μL | 200 μL | 1.3 g |
| 3 | 2 mL | 40 μL | 400 μL | 750 μL | 100 μL | 100 μL | 1.3 g |

In other embodiments, more than one inorganic material may be added to the inorganic composition allowing incorporation at a certain percent into the formed composite for both biomedical and non-biomedical applications. The composite may have different types and/or amounts of dispersed inorganic particles with particle sizes ranging between 1 nm to 10 mm. Protocols to form such composites would likely be very similar to those listed in Table 1, although the resulting w/w % of the composite might be different. In some embodiments, wherein the inorganic particle is a fiber or rod-shaped, the inorganic particles may be up to 10 cm in length depending upon the intended use and size of the formed composite.

The inorganic component may be in the form of particles with various shapes and sizes, including but not limited to nanometer and micrometer-scale crystals, whiskers, rods, spheres, tetrapods and polybranched structures and fibers up to centimeter-scale.

A suitable solvent used should not damage the integrity of either the polymer or the inorganic component, yet provide flexibility to the composite. For example, ethylene glycol or glycerol or other similar high boiling point, non-corrosive, high viscosity non-toxic solvent and/or water may be used as a solvent for polymerization. The higher the amount of ethylene glycol (or glycerol) and the lower the amount of water in the polymerization mixture, the more flexible the as prepared composite tends to be. This is likely because less water would be evaporated during the polymerization process and a high boiling point and high viscosity solvent tends to stay within the composite as a lubricant after the composite is formed.

After the composite is formed, solvent exchange can be performed, either with a large volume of water to get rid of the viscous solvent within the composite, or with large volumes of viscous solvent to get rid of remaining water within the composites. Thus, to form flexible composites, the solvent used during polymerization need not always be a high viscosity, non-toxic solvent, although the presence of it increases the elasticity of the as prepared composites. The composite can also be made without the solvent, then perform the solvent exchange with ethylene glycol, glycerol, or water after polymerization to provide composites with flexibility. It has water when desired may be mixed together with an inorganic composition at 90. The mixture is mixed to form a polymerization mixture at 92 having even and good consistency. The polymerization mixture may then be polymerized into a mold for a desired shape and size at 94.

The length of time of mixing may vary. However, in most embodiments, the polymerization mixture should be a sufficiently consistent material, which may be checked visually or after polymerization with a method such as scanning electron microscopy (SEM) analysis.

The composites of the present invention may also be printed into 3-D objects with defined patterns by robotic deposition or robocasting with the adjustment of formulation to balance the solidification time and viscosity to ensure the quality of 3-D printing. In some embodiments, the composites are left inside the mold or container after solidification for additional hours or overnight at room temperature before removal.

Various methods may be used to generate composites with desired shapes and sizes, including, but not limited to, molding, making a large composite and then sculpting it into custom-fit shape, making a large composite and cutting it into smaller pieces, 3D-printing with computer assisted design, or stacking multiple pieces into desired size and shape and apply adhesives when necessary.

Polymerization may be carried out through various methods of free radical initiation mechanisms, including but not limited to, thermal initiation, photoinitiation, or redox initiation. For polymerization triggered by UV initiation, a photolithographic-like technique using a mask can facilitate the polymerization of composite into various three-dimensionally-shaped composites. For polymerization by thermal or redox initiation, the polymerization mixture may be individually deposited in a mold used to form the desired shape and size of each composite.

The solidification of the mixture to form the composite may take place at room temperature within several minutes using the exemplary protocols listed in Table 1. The protocols listed in Table 1 can be varied according to the teachings of the invention. For example, the protocols may be tailored to manipulate the polymerization time. For instance, a slower polymerization may be effected by the use of lower concentrations of initiators to adapt to the process of robocasting of composite materials that could take more than a few minutes.

In one embodiment, about 0.1-10 wt % (with respect to the monomers) of free radical or hydrogen abstracting photoinitiator may be used to create the bone composite. For example, 1 to 6 wt % (with respect to monomers) of a radical initiator can be used to initiate the polymerization process.

Polymerization of the composite may be achieved using hydrogen abstracting photoinitiators including, but not limited to, benzophenone, 2,2-dimethoxy-2-phenylacetophenone (DMPAP), dimethoxyacetophenone, xanthone, and/or thioxanthone. If solubility of the chosen photoinitiator is poor, desired concentration of the initiator can be achieved by adding a surfactant that enables the homogenization of the initiator in emulsions with higher initiator concentration.

Polymerization may also be carried out by thermal initiation, wherein the thermal initiator is generally a peroxide, a hydroperoxide, peroxo- or an azocompound selected from the group consisting of ammonium persulfate and sodium metasulfite, benzoylperoxide, potassium peroxodisulfate, ammonium peroxodisulfate, t-butyl hydroperoxide, 2,2'-azo-bisiobutyronitrile (AIBN), and azobisiocyanobutyric acid. The thermally induced polymerization may be performed by heating the polymerization mixture to temperatures between 30° C. and 120° C. Caution should be taken in thermal initiation of polymerization if heat can damage either the formed polymer or the inorganic components.

Polymerization may also be initiated by a redox initiator selected from the group consisting of mixtures of benzoyl peroxide-dimethylaniline, and ammonium peroxodisulfate-N,N,N',N'-tetramethylene-1,2-ethylenediamine. The radical initiators, ammonium persulfate and sodium metasulfite, may be freshly made into aqueous solutions prior to use. These precautions ensure a fast gelation. It is possible, however, to slow down the solidification when necessary by decreasing the amount and concentrations of radical inhibitors used, or with deliberation inclusion of a low concentration of radical inhibitors that typically exist in commercial monomers.

Figure 1B:
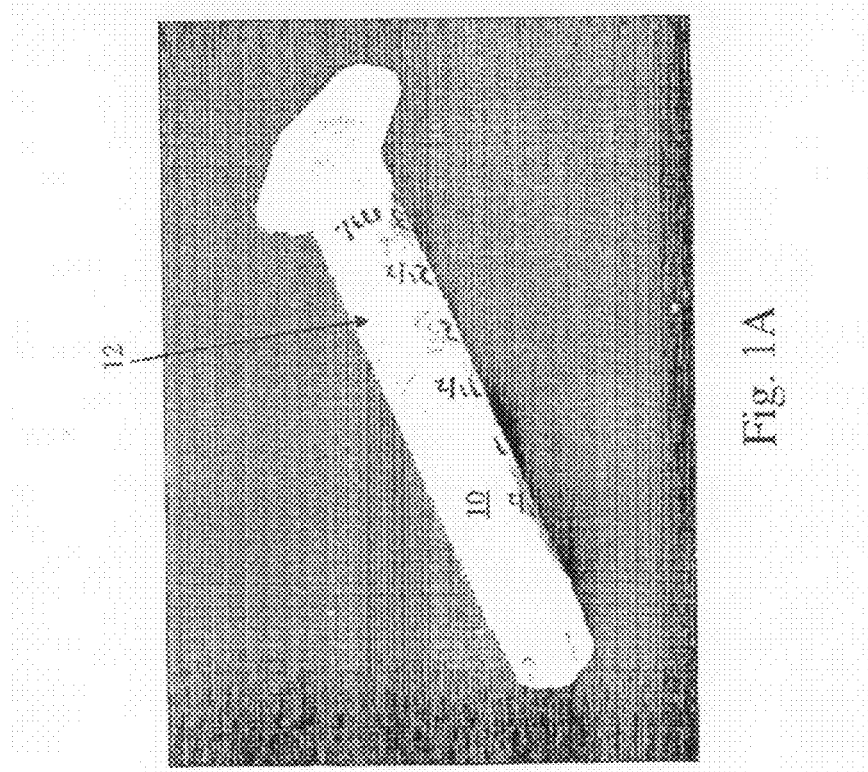

FIG. 1 illustrates the composite placed in a syringe. A polymerization mixture of pHEMA, EDGMA and HA powders may be mixed together in a scintillation vial and shaken thoroughly in the presence of a ceramic ball. FIG. 1, Panel A illustrates the mixture 10 transferred into a milliliter-volume plastic syringe 12. The syringe illustrated in FIG. 1, Panel A is not intended to be limiting as any other molds with the desired shape and size may be used. Polymerization occurs by free radical initiation at room temperature and solidification, as illustrated in FIG. 1, Panel B, is complete within 1-10 minutes (an exothermic process). The HEMA monomer should be freshly distilled and the crosslinker EGDMA should be stored over activated molecular sieves to remove radical inhibitors prior to use.

After polymerization, the resulting composite shows impressive mechanical properties that combine the elasticity of the hydrogel and the strength of the inorganic phase due to good dispersion and integration of inorganic particles, such as hydroxyapatite, throughout the hydrogel scaffold. In contrast, these properties have not been achieved by some commonly known polymer-based bone cements such as those listed in Table 2 below.

TABLE 2

| Materials | Strength (MPa) | Young's Modulus (GPa) |
| --- | --- | --- |
| Plain PMMA bone cement | 70-120 (compressive) | 2-3 (bending) |
| PMMA bone cement loaded with antibiotics | 70-100 (compressive) | 2-3 (bending) |
| PLA-granular HA composites (dry) | 120-150 (compressive) | 5-12 (bending) |
| PLA-HA fiber composites (dry) | 50-70 (bending) | 3-12 (bending) |
| Cortical bone (wet at high strain rate) | 50-150 (compressive) | 2-15 |
| Cancellous bone | 2-12 (compressive) | 0.05-0.5 |
| Dense HA | 500-1000 (compressive) | 80-110 |
| Large single crystal HA |  | 114 |

For instance, the compressive strength of selected dry composite samples, ranging from 250-700 MPa, far exceeds that of the PMMA cement or PLA-HA composites, which are typically between 50-150 MPa. More importantly, the composite materials of the invention, either in solvated or dry state, generally deform without undergoing brittle fracture and exhibit little to no crumbling and disintegration even when the compressive strain reached up to 90% and the compressive stress reaching hundreds MPa.

Figure 3A:
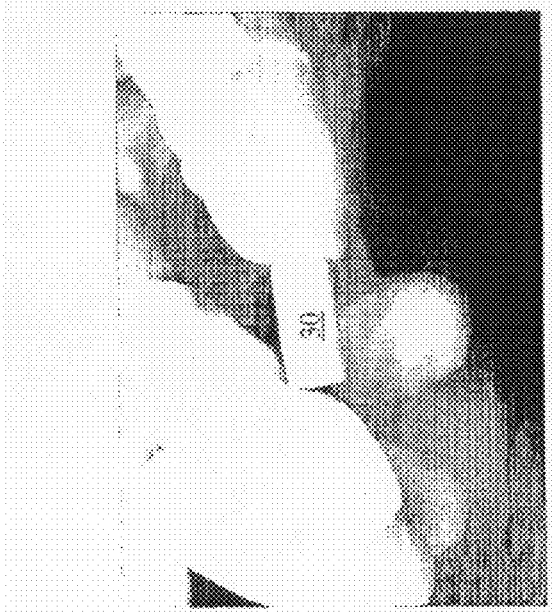
FIG. 3 illustrate the ability of the composite to be compressed.
Figure 3B:
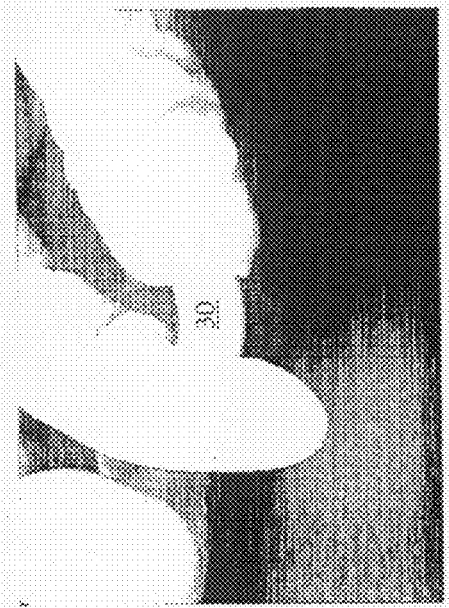
Figure 2A:
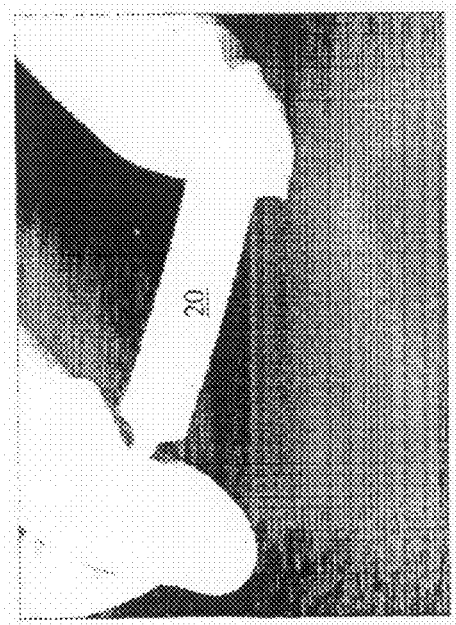
FIG. 2 illustrates the ability of the composite to bend.
Figure 2B:
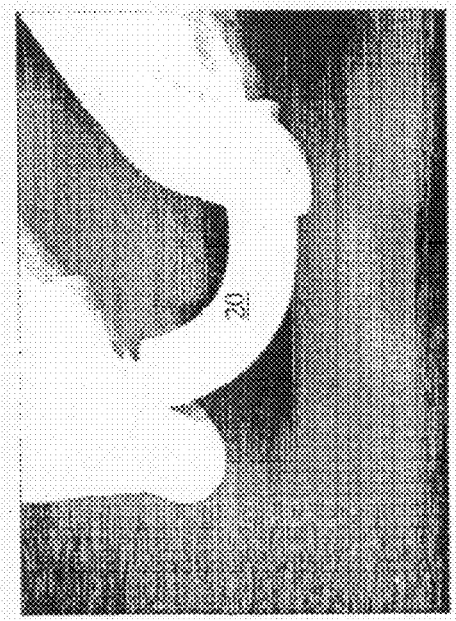

FIG. 2 illustrates the ability of the composite to bend and FIG. 3 illustrates the ability of the composite to be compressed. The as prepared (AP) composites may be prepared and cut into any size and shape. It may also be freeze-dried or rehydrated with water or non-toxic viscous solvents such as glycerol. As illustrated in FIG. 2, the composite 20 may be manually bent with ease. Additionally, as illustrated in FIG. 3, the composite 30 may also be compressed or squeezed manually with ease. Freeze-dried composites tend to be much stiffer, but may also be bent and compressed up to 90% (strain) under mechanical loads in the MPa range.

A large number of parameters may be changed during the preparation to allow the fine-tuning of both the mechanical property and bioresorbability/biodegradability of the composite. The high HA content of the composites generated by this process offers not only necessary mechanical strength, but also a resorbable and osteophilic environment for tissue ingrowth. Various forms of hydroxyapatites, such as commercial polycrystalline HA powders, calcined HA particles, single crystalline HA whiskers and HA nanoparticles, as well as various forms of calcium phosphates and bioactive glasses (e.g. glasses in the Si—Na—Ca—P—O or Si—Na—K—Ca—Mg—P—O systems), may be used to generate bone-like composites using this process to afford hybrid materials with a range of mechanical properties and potentially tunable in vivo resorbability. Moreover, the crosslinker of the pHEMA scaffold may be designed to be peptide-based substrates for in vivo enzymatic activity, such as MMP substrates, to make the hydrogel component also biodegradable.

An extended mineral layer may also be grown in the hydrogel polymers. For exemplary purposes only, and not intended to be limiting, the composites and methods described in co-pending U.S. patent application Ser. No. 10/740,739 may be used to grow the mineral layer.

Although the hybrid materials described herein are fully dense, it is possible to use properly designed monomers and monomer derivatives and longer crosslinkers at a lower percentage to generate porous hybrid materials using this protocol. For example, and not intended to be limiting, the use of anionic HEMA derivative, instead of HEMA, during gelation leads to the generation of highly porous scaffold, which can be of use in pre-implantation cell seeding, nutrient delivery and post-implantation tissue ingrowth.

Thus, the bone composite may have different porosities. The porosity can be controlled by the total polymerization time, temperature and/or irradiation power, chemical nature and percentage of monomers and crosslinkers, concentration of initiator, and composition and percentage of a porogen in a porogenic solvent. The porogen may be selected from a variety of different types of materials such as aliphatic hydrocarbons, aromatic hydrocarbons, esters, amides, alcohols, ketones, ethers, solutions of soluble polymers, and mixtures thereof. The porogen is generally present in the polymerization mixture in an amount of about 40 to 90 vol %, more preferably about 50 to 80 vol %. In a preferred embodiment, the porogen is 1-decanol or cyclohexanol.

The method of making flexible pHEMA-HA composites described herein may be extended to making other hybrid composites, such as hydrogel-piezoelectric ceramic composites, hydrogel-ferrite composites and hydrogel-superconductor composites.

The composites described herein are easily processed, lightweight and inexpensive. Additionally, the methods described herein, in contrast to the preparation of natural rubber-based composites, does not require the mixing of various ingredients using a torque-rhuometer nor would it have to be molded by hydraulic press at high temperatures. Moreover, the composites of the present invention exhibit strong organic-inorganic interface, and do not fail at high compression even at 80% or higher compression. In contrast, high temperature superconductor ceramics (such as YBaCuO) are typically brittle and have poor mechanical properties. Furthermore, the procedures and composites described herein can be extended to the fabrication of hydrogel-superconductor composites to be used as flexible superconducting tapes (e.g. for magnetic shielding), wires, and cylinders. Since the commonly used YBaCuO superconductor reacts with water, the process may need to be adapted to exclude the use of water. Thus, one can conceive the use of ethylene glycol as solvent and an organic radical initiator along with monomers and crosslinkers described herein to create such hydrogel-superconductor composites.

Hydrogel-ferrite composites may be made by using ferrite powders and compounds, such as $NiFe_2O_4$ and $Ni0.5Zn0.5Fe_2O_4$, as the inorganic composition and forming the composites. Such hydrogel-ferrite composites could be used for example, in magnetic memory, flexible magnets, microwave absorbers, etc.

The method may be extended to the preparation of other functional hybrid materials where the elastic property of the hydrogel matrix may be combined with the electronic, magnetic conducting/insulating and biological properties of the inorganic component for preparation of high dielectric constant materials, pressure-induced sensing applications and the like. For example, one may design a pHEMA-metal hybrid composite that is insulating but upon compression can be conducting. By taking advantage of the elastic nature of the composite, one can squeeze the formed composite to force the metal particles to come in contact with each other and thereby produce an insulating-to-conducting switch, e.g., a pressure sensor.

Porous ceramic or metallic materials may be prepared via various existing fabrication techniques, infiltrated with various polymerization mixtures, then allowed to polymerize to form ceramic or metal-based composites. Techniques of forming porous inorganic scaffold may include partial sintering of metal and ceramic compacts, freeze casting, use of porogens (e.g., carbon spheres or naphthalene) and all polymer foams that will burn away during sintering, and various computer-assisted rapid prototyping techniques such as 3D printing, stereolithography, and robocasting. The resulting composites generated under these schemes has a more rigid skeleton and exhibit a different set of mechanical properties because they provide full infiltration and good adhesion at the organic-inorganic interface.

Scanning electron microscopy (SEM) analysis composite samples containing varied contents of HA from various sources show that HA crystals are well-dispersed and well-integrated with the pHEMA hydrogel. X-ray powder diffraction of the composite showed reflections that are characteristic of randomly oriented HA crystals.

Calcined HA was also shown to be well dispersed throughout the hydrogel polymer, even when the HA content was increased to 48 w/w %. Furthermore, the good integration of mineralization and the hydrogel polymer was also observed with freeze-dried samples, with no cracks formed at the mineral-gel interface. HA whiskers were also shown to be well-dispersed in hydrogel polymer, again with strong HA-gel interface. It is worth mentioning that although fracturing occurred with HA whiskers upon compression (~80% strain), the fracturing of the crystals did not propagate into the hydrogel. In fact, no delamination at the HA whisker-hydrogel interface was observed even surrounding the fractured whiskers. Another indirect evidence for the good HA-pHEMA integration is that incubation of the composites, in either MilliQ water or simulated body fluid at 37° C. for more than 3 months, did not cause any detectable leaking of HA particles from the composites or microstructural changes by SEM.

FIG. 4 shows graphs illustrating composite stress-strain curve trends. Standard unconfined compression tests were performed to evaluate the compressive behavior of the gels and the composites. Short cylindrical samples, nominally 3-4 mm in height and roughly 4 mm in diameter, were cut from the bulk material. Testing was performed in ambient air on a high-capacity MTS servo-hydraulic mechanical testing machine (MTS Systems Corporation, Eden Prairie, Minn.) fitted with stiff, non-deforming platens. FIG. 4, Panel A illustrates the stress-strain curve for a freeze-dried composite containing 37 w/w % of commercial HA, which is also referenced as Protocol 3 of Table 1. The composite underwent greater than 80% strain and up to 600 MPa stress without fracturing. FIG. 4, Panel B illustrates the stress-strain curve for an AP composite containing 37 w/w % commercial HA, which is also referenced as Protocol 1 of Table 1. The composite underwent greater than 80% strain and up to 50 MPa stress without fracturing.

Figure 5:
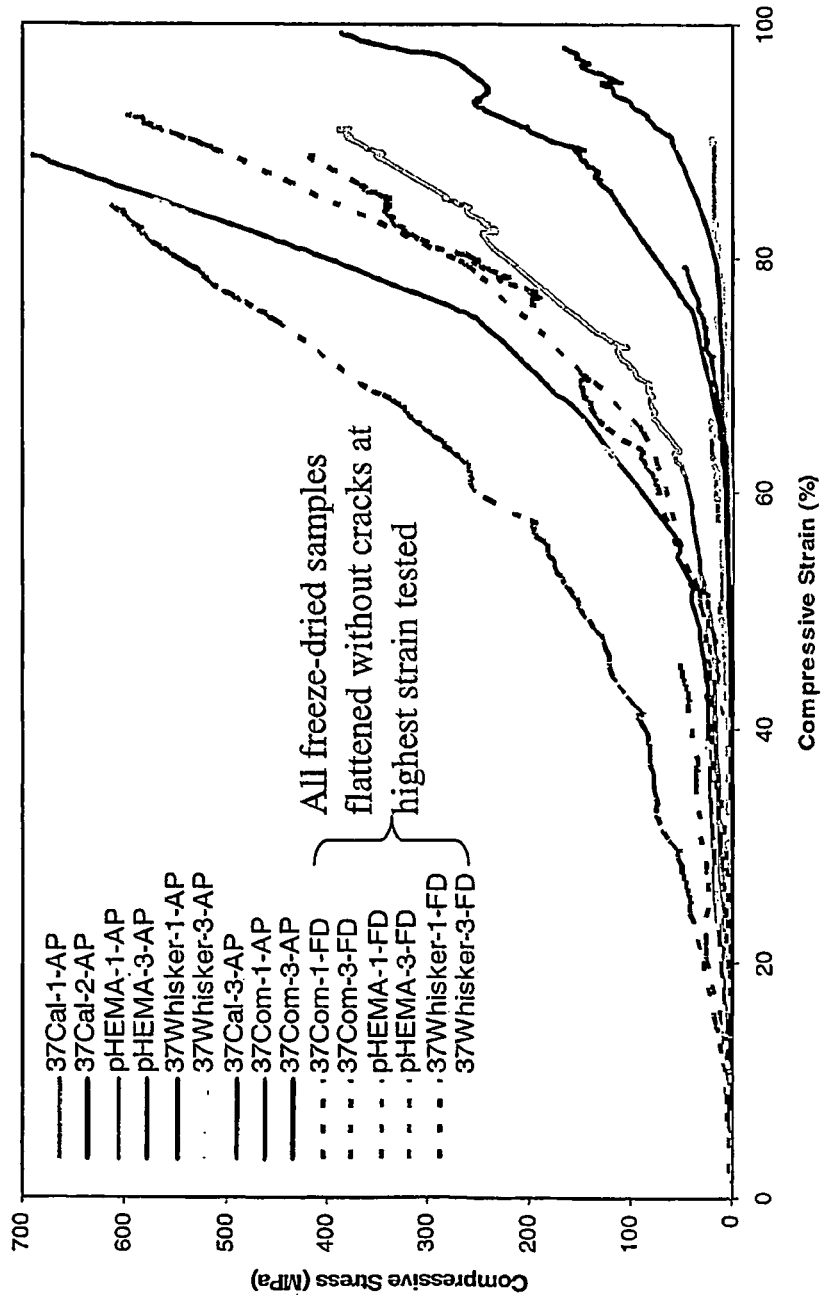
FIG. 5 is a stress-strain graph illustrating the general trend of the mechanical properties of composites containing 37 w/w % HA. Each numbered curve corresponds to a sample as follows: 37Cal-1-AP (curve 1), 37Cal-2-AP (curve 2), pHEMA-1-AP (curve 3), pHEMA-3-AP (curve 4), 37Whiskers-1-AP (curve 5), 37Whiskers-3-AP (curve 6), 37Cal-3-AP (curve 7), 37Com-1-AP (curve 8), 37Com-3-AP (curve 9), 37Com-1-FD (curve 10), 37Com-3-FD (curve 11), pHEMA-1-FD (curve 12), pHEMA-3-FD (curve 13), 37Whiskers-1-FD (curve 14), and 37Whiskers-3-FD (curve 15). All freeze-dried samples (i.e., 37Com-1-FD, 37Com-3-FD, pHEMA-1-FD, pHEMA-3-FD, 37Whiskers-1-FD, and 37Whiskers-3-FD) flattened without cracks at highest strain tested.

The stress-strain curves shown in FIG. 5 illustrate the general trend of the mechanical properties of composites containing 37 w/w % HA using various conditions and post-formation treatments. In summary, by comparing the compressive stress needed to reach a given compressive strain, it is found that the stiffness, strength and toughness of freeze-dried composites were greater than as prepared composites of the same composition. Freeze-dried HA-pHEMA composites, which were comprised of commercially-available polycrystalline HA (Alfa Aesar), were stiffer and stronger than freeze-dried HA whisker-pHEMA composites. As prepared HA-pHEMA composites using commercially-available polycrystalline HA were stiffer and stronger than those of as prepared calcined HA-pHEMA, which in turn were stiffer and stronger than as prepared whisker HA-pHEMA composites. The composites prepared using Protocol 3 were stiffer than those prepared using Protocol 1.

Finally, as expected, the pHEMA-HA composites were stiffer than pure pHEMA at both as prepared and freeze-dried states.

Most composites including all freeze-dried composites tested did not show brittle fracture and flattened without cracks at the highest strain applied. Some were able to recover mostly from the deformation upon the release of mechanical loads after reaching high stain levels. Only two samples tested, 37Cal-1-AP and 37Com-1-AP, were crushed at the highest stress level applied, at greater than 85% and 95% strain levels, respectively. At a median strain level such as 50% compressive strain, none of the composites tested failed.

Under a high compression stress test and upon analysis of the composite before and after being flattened, the peripheries of the flattened composites show some cracks, but the center remained crack-free. This indicates good mineral-ceramic integration. This is further confirmed at the microscopic level by SEM micrographs taken before and after the application of the high compression stress. The freeze-dried composite prepared using Protocol 3, which contains 48 w/w % commercial HA, exhibited no crack formation throughout the scaffold even upon the application of 550 MPa compression stress to reach ~70% strain. The interface between the HA crystals and the pHEMA gel remained intact.

Tests have further shown that some composites were able to partially spring back after the release of high compression stress. The SEM micrographs of a representative elastic composite, 41 Com-3-AP, showed no crack formation before or after the mechanical stress at neither HA crystal, hydrogel phase, or the HA-gel interface.

Figure 6:
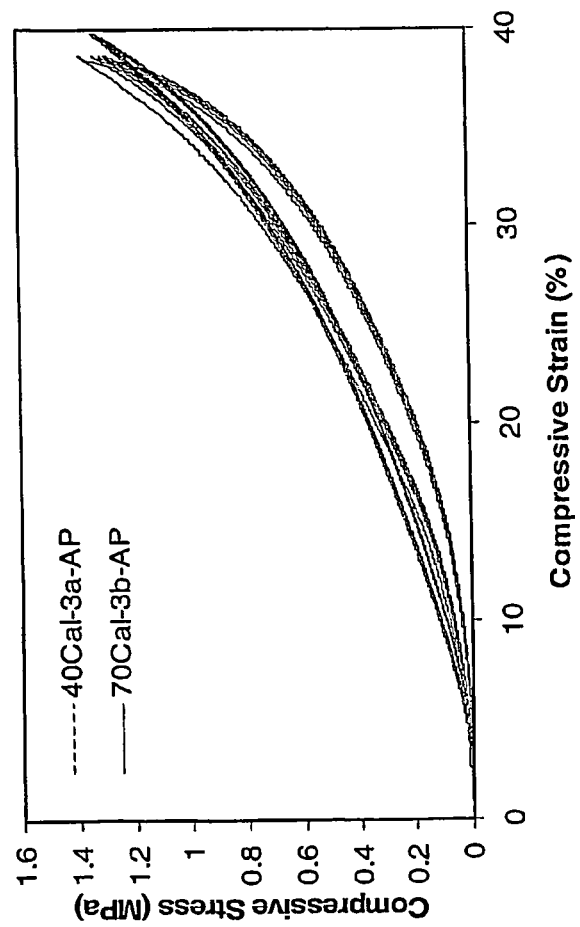
FIG. 6 is a graph illustrating the reversibility of the compressive behavior of the composites.

FIG. 6 is a graph illustrating the reversibility of the compressive behavior of the composites. To function as a bone/joint substitute, the composite material must withstand repeated physiological loading and unloading without failure or structural change. The reversibility of the compressive behavior of as prepared composites at moderate strain (less than 40%, i.e. with mechanical load in the order of a few megapascals (MPa)) was characterized with repetitive loading and unloading. As shown in FIG. 6, as-prepared composites possessing 40% (40Cal-3-AP) or 70% (70Cal-4-AP) calcined HA powder were both able to recover from repetitive moderate strains, with minimal energy dissipation (area between the loading and unloading curves) observed within the tested strain levels. Similarly, as-prepared composites containing 37% commercial HA powder (37Com-3-AP) displayed reversible compressive behavior at moderate compressive strains.

Figure 7:
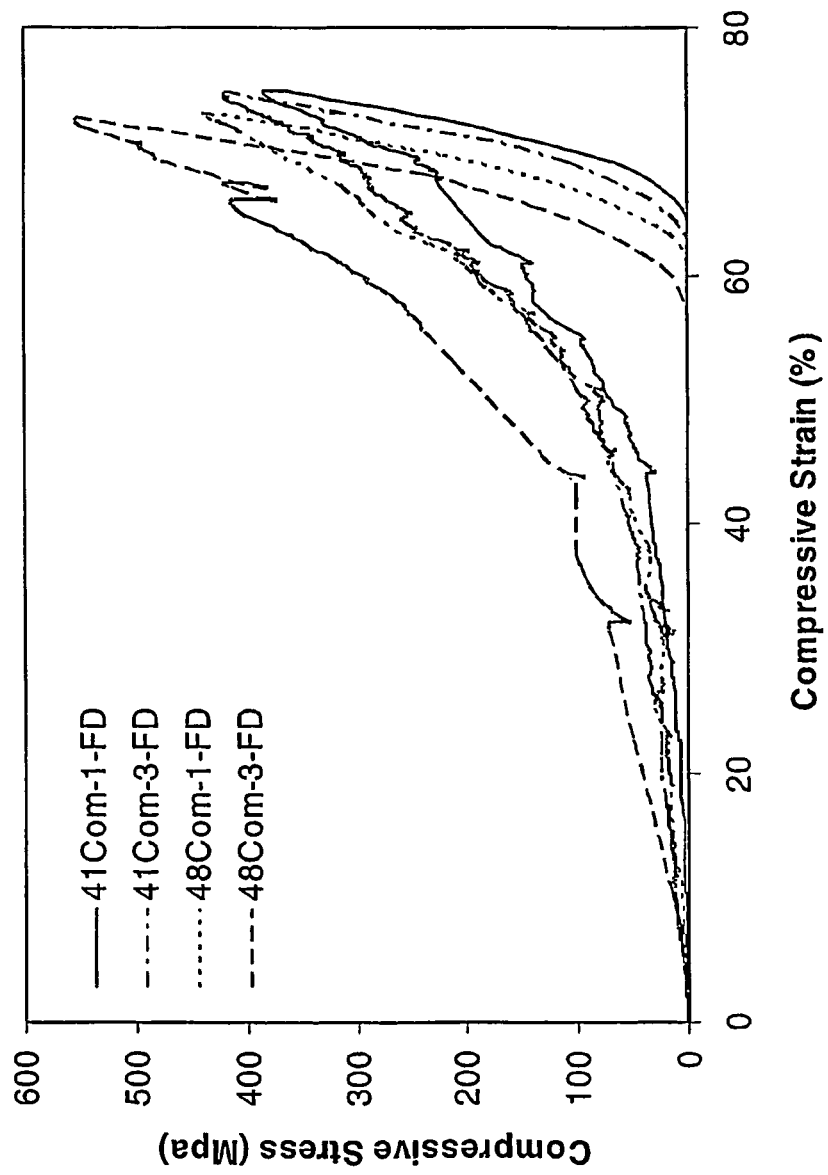
FIG. 7 is a graph illustrating the stress-strain curves of composites containing various amounts of commercial HA.

FIG. 7 is a graph illustrating the stress-strain curves of composites containing various amounts of commercial HA. It has been determined that the tensile Young's modulus of compact bone shows a strong positive relationship with mineral content. The ultimate strain and the work under the stress-strain curve decrease with increasing mineral content. Results presented herein are in agreement with this general trend observed with natural bone samples. Specifically, as shown in FIG. 6, higher HA contents (48 w/w % vs. 41 w/w %) and the use of Protocol 3 (as compared to Protocol 1) led to the formation of stronger, stiffer and tougher composites upon freeze-drying. The same trend was also observed for as prepared samples with varied HA contents.

Figure 8:
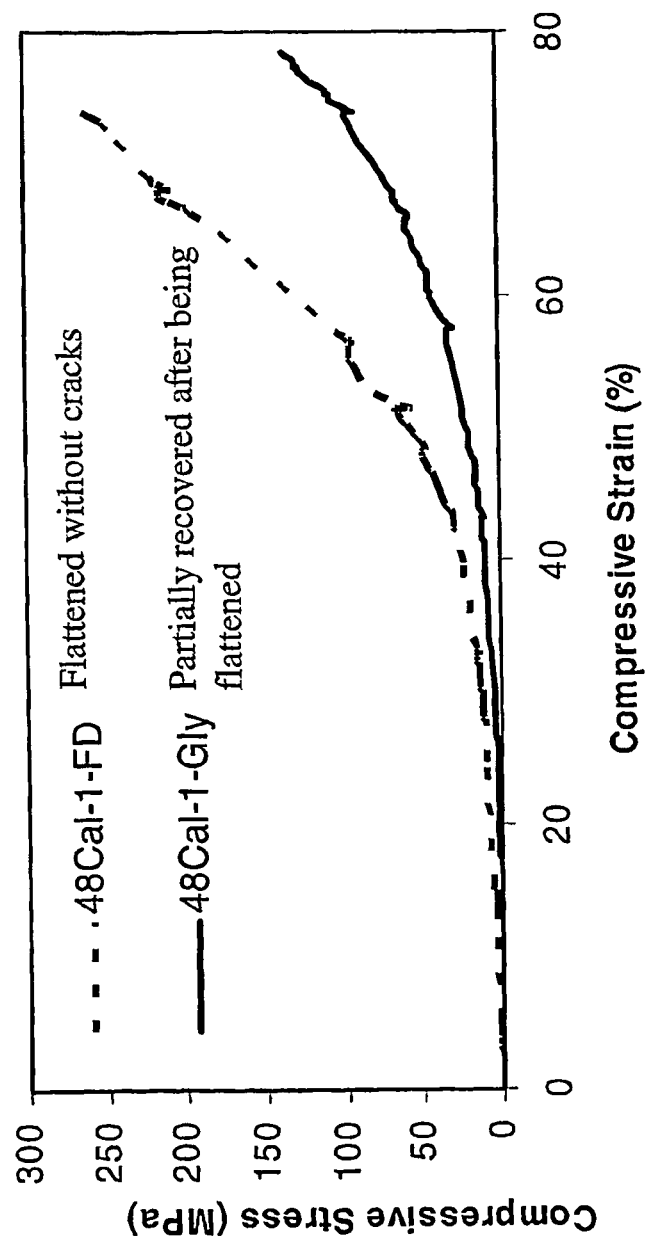
FIG. 8 is a graph illustrating the stress-strain curves of calcined HA composites upon solvent exchange with glycerol.

FIG. 8 is a graph illustrating the stress-strain curves of calcined HA composites upon solvent exchange with glycerol. It has been shown that the exchange of water and ethylene glycol with viscous and non-toxic solvent glycerol is a convenient and effective post-formation processing technique to fine-tune the mechanical property of the composites. In general, the composites treated with glycerol remain fairly elastic comparing to their freeze-dried counterparts. As shown in FIG. 7, whereas the freeze-dried composites containing 48 w/w % calcined HA underwent up to ~75% strain under 275 MPa stress resulting in an irreversible flattening of the sample without fracturing, the samples that were previously treated by glycerol were able to partially recover (spring back) upon the release of compression loading even after reaching ~80% compressive strain. SEM micrographs show that neither the freeze-dried sample nor the glycerol exchanged sample exhibited any degree of fracturing on the microscopic scale upon the application of high compression loads. The calcined HA-gel interface did not delaminate throughout the compression tests.

The composites may be comprised of pHEMA and HA because they are known to be biocompatible materials. In one embodiment, to confirm the minimal cytotoxicity of the composites formed by HA and pHEMA and its derivatives, pHEMA-based copolymers containing anionic amino acids (Asp and Glu) were formed in the presence of HA suspension and subjected to cell culture studies using human osteosarcoma TE85 cells. In a typical procedure, 200 mg of HEMA (in the case of anionic copolymers, 1-10% of them being the corresponding anionic amino acid-MA) was mixed with 2 wt % of crosslinker EGDMA and 50 μl of commercial polycrystalline HA suspension (100 mg/mL, sonicated prior to the experiment to break aggregates) along with ethylene glycol and radical initiators. The hydrogel-HA composites were allowed to form at room temperature overnight, before they were thoroughly washed in Millipore water to remove excess amount of radical initiators for cell culture. Cells were fixed and freeze-dried along with the hydrogel-HA composite prior to SEM observation.

SEM micrographs showed cell attachment and proliferation of osteosarcoma TE85 on pHEMA-co-(1-10% X-MA)-HA composites (X=Asp or glu) 4 days after initial cell seeding, suggesting minimal cytotoxicity these materials exerted on the TE85 cells. This is also an indirect evidence of the removal of excess radical initiators. The composite materials may also be used as medical implants.

The composites described herein formed at given formulation and processing conditions can sustain compressive strains up to over 90% and over 700 MPa stress without any fracturing. In addition, SEM microstructural analyses reveal uniform dispersion of HA throughout the 3-D hydrogel network with excellent mineral-gel integration. Even at very high compressive stress load, the commercial and calcined HA crystal do not exhibit any crack formation, neither did the hydrogel phase and crystal-gel interface, suggesting excellent materials integration. Although the long HA whiskers broke under very high mechanical compression loading, these cracks did not propagate beyond the gel-whisker interface to extend into the hydrogel phase. These properties make the composite of the invention an excellent candidate for structural materials.

Due to the ease of preparation (the composites may be formed within minutes without the need for any advanced equipment) and the possibility of processing the functional composite materials into various sizes and shapes, the composite has significant value to clinical applications, especially for the repair of bone defects. The materials can be easily cut into suitable shapes and their elasticity allows the tight-fitting (by compression) of the bone implant into the area of defect without the need of further fixation procedures (e.g. via the use of surgical screws) for orthopedic applications. Furthermore, the freeze-dried composites may be inserted into an area of defect and results in the in situ swelling of the sample in the biological aqueous environment making it fit more snugly at the site of implantation.

The following examples below are for exemplary purposes only and are not intended to be limiting.

EXAMPLES

Typical composite preparation protocols are described below with reference to Table 1. Initiator 1 is ammonium persulfate (480 mg/ml, in water) and Initiator 2 is sodium metasulfite (180 mg/ml, in water).

Preparing composite containing 37 w/w % commercial HA using Protocol 1:
1. Take 2 ml of HEMA and place in a scintillation vial;
2. Add 1.1 mL ethylene glycol and mix well;
3. Add 40 µl EDGMA to the mixture, and mix well;
4. Add 200 µl Initiator-1 to the mixture, immediately followed by the addition of 200 µl Initiator-2, mix well;
5. Add 1.3 g commercial HA and shake in the presence of a ceramic ball to mix;
6. Uptake the mixture in a 3 mL plastic syringe and allowed to gel at room temperature;
7. The resulting rubbery material is taken out of the syringe and cut into pieces (37Com-1-AP); some are soaked in a large volume of water overnight before being freeze-dried (37Com-1-FD) or further exchanged by glycerol (37Com-1-Gly).

Preparing composite containing 37 w/w % commercial HA using Protocol 2:
1. Take 2 ml of HEMA and place in a scintillation vial;
2. Add 0.4 mL ethylene glycol and 0.75 mL water and mix well;
3. Add 40 µl EDGMA to the mixture, and mix well;
4. Add 200 µl Initiator-1 to the mixture, immediately followed by the addition of 200 µl Initiator-2, mix well;
5. Add 1.3 g commercial HA and shake in the presence of a ceramic ball to mix;
6. Uptake the mixture in a 3 mL plastic syringe and allowed to gel at room temperature;
8. The resulting rubbery material is taken out of the syringe and cut into pieces (37Com-2-AP); some are soaked in a large volume of water overnight before being freeze-dried (37Com-2-FD) or further exchanged by glycerol (37Com-2-Gly).

Preparing composite containing 37 w/w % commercial HA using Protocol 3:
1. Take 2 ml of HEMA and place in a scintillation vial;
2. Add 0.4 mL ethylene glycol and 0.75 mL water and mix well;
3. Add 40 µl EDGMA to the mixture, and mix well;
4. Add 100 µl Initiator-1 to the mixture, immediately followed by the addition of 100 µl Initiator-2, mix well;
5. Add 1.3 g commercial HA and shake in the presence of a ceramic ball to mix;
6. Uptake the mixture in a 3 mL plastic syringe and allowed to gel at room temperature;
9. The resulting rubbery material is taken out of the syringe and cut into pieces (37Com-3-AP); some are soaked in a large volume of water overnight before being freeze-dried (37Cal-3-FD) or further exchanged by glycerol (37Com-3-Gly).

Preparing composite containing 37 w/w % calcined HA using Protocol 1:
1. Take 2 ml of HEMA and place in a scintillation vial;
2. Add 1.1 mL ethylene glycol and mix well;
3. Add 40 µl EDGMA to the mixture, and mix well;
4. Add 200 µl Initiator-1 to the mixture, immediately followed by the addition of 200 µl Initiator-2, mix well;
5. Add 1.3 g calcined HA and shake in the presence of a ceramic ball to mix;
6. Uptake the mixture in a 3 mL plastic syringe and allowed to gel at room temperature;
10. The resulting rubbery material is taken out of the syringe and cut into pieces (37Cal-1-AP); some are soaked in a large volume of water overnight before being freeze-dried (37Cal-1-FD) or further exchanged by glycerol (37Cal-1-Gly).

Preparing composite containing 37 w/w % calcined HA using Protocol 2:
1. Take 2 ml of HEMA and place in a scintillation vial;
2. Add 0.4 mL ethylene glycol and 0.75 mL water and mix well;
3. Add 40 µl EDGMA to the mixture, and mix well;
4. Add 200 µl Initiator-1 to the mixture, immediately followed by the addition of 200 µl Initiator-2, mix well;
5. Add 1.3 g calcined HA and shake in the presence of a ceramic ball to mix;
6. Uptake the mixture in a 3 mL plastic syringe and allowed to gel at room temperature;
7. The resulting rubbery material is taken out of the syringe and cut into pieces (37Cal-2-AP); some are soaked in a large volume of water overnight before being freeze-dried (37Cal-2-FD) or further exchanged by glycerol (37Cal-2-Gly).

Preparing composite containing 37 w/w % calcined HA using Protocol 3:
1. Take 2 ml of HEMA and place in a scintillation vial;
2. Add 0.4 mL ethylene glycol and 0.75 mL water and mix well;
3. Add 40 µl EDGMA to the mixture, and mix well;
4. Add 100 µl Initiator-1 to the mixture, immediately followed by the addition of 100 µl Initiator-2, mix well;
5. Add 1.3 g calcined HA and shake in the presence of a ceramic ball to mix;
6. Uptake the mixture in a 3 mL plastic syringe and allowed to gel at room temperature;
7. The resulting rubbery material is taken out of the syringe and cut into pieces (37Cal-3-AP); some are soaked in a large volume of water overnight before being freeze-dried (37Cal-3-FD) or further exchanged by glycerol (37Cal-3-Gly).

Preparing composite containing 37 w/w % HA whisker using Protocol 1:
1. Take 2 ml of HEMA and place in a scintillation vial;
2. Add 1.1 mL ethylene glycol and mix well;
3. Add 40 µl EDGMA to the mixture, and mix well;
4. Add 200 µl Initiator-1 to the mixture, immediately followed by the addition of 200 µl Initiator-2, mix well;
5. Add 1.3 g HA whiskers and shake in the presence of a ceramic ball to mix;
6. Uptake the mixture in a 3 mL plastic syringe and allowed to gel at room temperature;
7. The resulting rubbery material is taken out of the syringe and cut into pieces (37whisker-1-AP); some are soaked in a large volume of water overnight before being freeze-dried (37whisker-1-FD) or further exchanged by glycerol (37whisker-1-Gly).

Preparing composite containing 37 w/w % HA whisker using Protocol 2:
1. Take 2 ml of HEMA and place in a scintillation vial;
2. Add 0.4 mL ethylene glycol and 0.75 mL water and mix well;
3. Add 40 µl EDGMA to the mixture, and mix well;
4. Add 200 µl Initiator-1 to the mixture, immediately followed by the addition of 200 µl Initiator-2, mix well;

5. Add 1.3 g HA whisker and shake in the presence of a ceramic ball to mix;
6. Uptake the mixture in a 3 mL plastic syringe and allowed to gel at room temperature;
7. The resulting rubbery material is taken out of the syringe and cut into pieces (37whisker-2-AP); some are soaked in a large volume of water overnight before being freeze-dried (37whisker-2-FD) or further exchanged by glycerol (37whisker-2-Gly).

Preparing composite containing 37 w/w % HA whisker using Protocol 3:
1. Take 2 ml of HEMA and place in a scintillation vial;
2. Add 0.4 mL ethylene glycol and 0.75 mL water and mix well;
3. Add 40 µl EDGMA to the mixture, and mix well;
4. Add 100 µl Initiator-1 to the mixture, immediately followed by the addition of 100 µl Initiator-2, mix well;
5. Add 1.3 g HA whisker and shake in the presence of a ceramic ball to mix;
6. Uptake the mixture in a 3 mL plastic syringe and allowed to gel at room temperature;
7. The resulting rubbery material is taken out of the syringe and cut into pieces (37whisker-3-AP); some are soaked in a large volume of water overnight before being freeze-dried (37whisker-3-FD) or further exchanged by glycerol (37whisker-3-Gly).

Preparing composite containing 41 w/w % commercial HA using Protocol 1:
1. Take 2 ml of HEMA and place in a scintillation vial;
2. Add 1.1 mL ethylene glycol and mix well;
3. Add 40 µl EDGMA to the mixture, and mix well;
4. Add 200 µl Initiator-1 to the mixture, immediately followed by the addition of 200 µl Initiator-2, mix well;
5. Add 1.5 g commercial HA and shake in the presence of a ceramic ball to mix;
6. Uptake the mixture in a 3 mL plastic syringe and allowed to gel at room temperature;
7. The resulting rubbery material is taken out of the syringe and cut into pieces (41Com-1-AP); some are soaked in a large volume of water overnight before being freeze-dried (41Com-1-FD) or further exchanged by glycerol (41Com-1-Gly).

Preparing composite containing 41 w/w % commercial HA using Protocol 2:
1. Take 2 ml of HEMA and place in a scintillation vial;
2. Add 0.4 mL ethylene glycol and 0.75 mL water and mix well;
3. Add 40 µl EDGMA to the mixture, and mix well;
4. Add 200 µl Initiator-1 to the mixture, immediately followed by the addition of 200 µl Initiator-2, mix well;
5. Add 1.5 g commercial HA and shake in the presence of a ceramic ball to mix;
6. Uptake the mixture in a 3 mL plastic syringe and allowed to gel at room temperature;
7. The resulting rubbery material is taken out of the syringe and cut into pieces (41Com-2-AP); some are soaked in a large volume of water overnight before being freeze-dried (41Com-2-FD) or further exchanged by glycerol (41Com-2-Gly).

Preparing composite containing 41 w/w % commercial HA using Protocol 3:
1. Take 2 ml of HEMA and place in a scintillation vial;
2. Add 0.4 mL ethylene glycol and 0.75 mL water and mix well;
3. Add 40 µl EDGMA to the mixture, and mix well;
4. Add 100 µl Initiator-1 to the mixture, immediately followed by the addition of 100 µl Initiator-2, mix well;
5. Add 1.5 g commercial HA and shake in the presence of a ceramic ball to mix;
6. Uptake the mixture in a 3 mL plastic syringe and allowed to gel at room temperature;
7. The resulting rubbery material is taken out of the syringe and cut into pieces (41Com-3-AP); some are soaked in a large volume of water overnight before being freeze-dried (41Com-3-FD) or further exchanged by glycerol (41Com-3-Gly).

Preparing composite containing 41 w/w % calcined HA using Protocol 1:
1. Take 2 ml of HEMA and place in a scintillation vial;
2. Add 1.1 mL ethylene glycol and mix well;
3. Add 40 µl EDGMA to the mixture, and mix well;
4. Add 200 µl Initiator-1 to the mixture, immediately followed by the addition of 200 µl Initiator-2, mix well;
5. Add 1.5 g calcined HA and shake in the presence of a ceramic ball to mix;
6. Uptake the mixture in a 3 mL plastic syringe and allowed to gel at room temperature;
7. The resulting rubbery material is taken out of the syringe and cut into pieces (41Cal-1-AP); some are soaked in a large volume of water overnight before being freeze-dried (41Cal-1-FD) or further exchanged by glycerol (41Cal-1-Gly).

Preparing composite containing 41 w/w % calcined HA using Protocol 2:
1. Take 2 ml of HEMA and place in a scintillation vial;
2. Add 0.4 mL ethylene glycol and 0.75 mL water and mix well;
3. Add 40 µl EDGMA to the mixture, and mix well;
4. Add 200 µl Initiator-1 to the mixture, immediately followed by the addition of 200 µl Initiator-2, mix well;
5. Add 1.5 g calcined HA and shake in the presence of a ceramic ball to mix;
6. Uptake the mixture in a 3 mL plastic syringe and allowed to gel at room temperature;
7. The resulting rubbery material is taken out of the syringe and cut into pieces (41Cal-2-AP); some are soaked in a large volume of water overnight before being freeze-dried (41Cal-2-FD) or further exchanged by glycerol (41Cal-2-Gly).

Preparing composite containing 41 w/w % calcined HA using Protocol 3:
1. Take 2 ml of HEMA and place in a scintillation vial;
2. Add 0.4 mL ethylene glycol and 0.75 mL water and mix well;
3. Add 40 µl EDGMA to the mixture, and mix well;
4. Add 100 µl Initiator-1 to the mixture, immediately followed by the addition of 100 µl Initiator-2, mix well;
5. Add 1.5 g calcined HA and shake in the presence of a ceramic ball to mix;
6. Uptake the mixture in a 3 mL plastic syringe and allowed to gel at room temperature;
7. The resulting rubbery material is taken out of the syringe and cut into pieces (41Cal-3-AP); some are soaked in a large volume of water overnight before being freeze-dried (41Cal-3-FD) or further exchanged by glycerol (41Cal-3-Gly).

Preparing composite containing 41 w/w % HA whisker using Protocol 1:
1. Take 2 ml of HEMA and place in a scintillation vial;
2. Add 1.1 mL ethylene glycol and mix well;
3. Add 40 µl EDGMA to the mixture, and mix well;
4. Add 200 µl Initiator-1 to the mixture, immediately followed by the addition of 200 µl Initiator-2, mix well;

5. Add 1.5 g HA whiskers and shake in the presence of a ceramic ball to mix;
6. Uptake the mixture in a 3 mL plastic syringe and allowed to gel at room temperature;
7. The resulting rubbery material is taken out of the syringe and cut into pieces (41whisker-1-AP); some are soaked in a large volume of water overnight before being freeze-dried (41whisker-1-FD) or further exchanged by glycerol (41whisker-1-Gly).

Preparing composite containing 41 w/w % HA whisker using Protocol 2:
1. Take 2 ml of HEMA and place in a scintillation vial;
2. Add 0.4 mL ethylene glycol and 0.75 mL water and mix well;
3. Add 40 µl EDGMA to the mixture, and mix well;
4. Add 200 µl Initiator-1 to the mixture, immediately followed by the addition of 200 µl Initiator-2, mix well;
5. Add 1.5 g HA whisker and shake in the presence of a ceramic ball to mix;
6. Uptake the mixture in a 3 mL plastic syringe and allowed to gel at room temperature;
7. The resulting rubbery material is taken out of the syringe and cut into pieces (41whisker-2-AP); some are soaked in a large volume of water overnight before being freeze-dried (41whisker-2-FD) or further exchanged by glycerol (41whisker-2-Gly).

Preparing composite containing 41 w/w % HA whisker using Protocol 3:
1. Take 2 ml of HEMA and place in a scintillation vial;
2. Add 0.4 mL ethylene glycol and 0.75 mL water and mix well;
3. Add 40 µl EDGMA to the mixture, and mix well;
4. Add 100 µl Initiator-1 to the mixture, immediately followed by the addition of 100 µl Initiator-2, mix well;
5. Add 1.5 g HA whisker and shake in the presence of a ceramic ball to mix;
6. Uptake the mixture in a 3 mL plastic syringe and allowed to gel at room temperature;
7. The resulting rubbery material is taken out of the syringe and cut into pieces (41whisker-3-AP); some are soaked in a large volume of water overnight before being freeze-dried (41whisker-3-FD) or further exchanged by glycerol (41whisker-3-Gly).

Preparing composite containing 48 w/w % commercial HA using Protocol 1:
1. Take 2 ml of HEMA and place in a scintillation vial;
2. Add 1.1 mL ethylene glycol and mix well;
3. Add 40 µl EDGMA to the mixture, and mix well;
4. Add 200 µl Initiator-1 to the mixture, immediately followed by the addition of 200 µl Initiator-2, mix well;
5. Add 2 g commercial HA and shake in the presence of a ceramic ball to mix;
6. Uptake the mixture in a 3 mL plastic syringe and allowed to gel at room temperature;
7. The resulting rubbery material is taken out of the syringe and cut into pieces (48Com-1-AP); some are soaked in a large volume of water overnight before being freeze-dried (48Com-1-FD) or further exchanged by glycerol (48Com-1-Gly).

Preparing composite containing 48 w/w % commercial HA using Protocol 2:
1. Take 2 ml of HEMA and place in a scintillation vial;
2. Add 0.4 mL ethylene glycol and 0.75 mL water and mix well;
3. Add 40 µl EDGMA to the mixture, and mix well;
4. Add 200 µl Initiator-1 to the mixture, immediately followed by the addition of 200 µl Initiator-2, mix well;
5. Add 2 g commercial HA and shake in the presence of a ceramic ball to mix;
6. Uptake the mixture in a 3 mL plastic syringe and allowed to gel at room temperature;
7. The resulting rubbery material is taken out of the syringe and cut into pieces (48Com-2-AP); some are soaked in a large volume of water overnight before being freeze-dried (48Com-2-FD) or further exchanged by glycerol (48Com-2-Gly).

Preparing composite containing 48 w/w % commercial HA using Protocol 3:
1. Take 2 ml of HEMA and place in a scintillation vial;
2. Add 0.4 mL ethylene glycol and 0.75 mL water and mix well;
3. Add 40 µl EDGMA to the mixture, and mix well;
4. Add 100 µl Initiator-1 to the mixture, immediately followed by the addition of 100 µl Initiator-2, mix well;
5. Add 2 g commercial HA and shake in the presence of a ceramic ball to mix;
6. Uptake the mixture in a 3 mL plastic syringe and allowed to gel at room temperature;
7. The resulting rubbery material is taken out of the syringe and cut into pieces (48Com-3-AP); some are soaked in a large volume of water overnight before being freeze-dried (48Com-3-FD) or further exchanged by glycerol (48Com-3-Gly).

Preparing composite containing 48 w/w % calcined HA using Protocol 1:
1. Take 2 ml of HEMA and place in a scintillation vial;
2. Add 1.1 mL ethylene glycol and mix well;
3. Add 40 µl EDGMA to the mixture, and mix well;
4. Add 200 µl Initiator-1 to the mixture, immediately followed by the addition of 200 µl Initiator-2, mix well;
5. Add 2 g calcined HA and shake in the presence of a ceramic ball to mix;
6. Uptake the mixture in a 3 mL plastic syringe and allowed to gel at room temperature;
7. The resulting rubbery material is taken out of the syringe and cut into pieces (48Cal-1-AP); some are soaked in a large volume of water overnight before being freeze-dried (48Cal-1-FD) or further exchanged by glycerol (48Cal-1-Gly).

Preparing composite containing 48 w/w % calcined HA using Protocol 2:
1. Take 2 ml of HEMA and place in a scintillation vial;
2. Add 0.4 mL ethylene glycol and 0.75 mL water and mix well;
3. Add 40 µl EDGMA to the mixture, and mix well;
4. Add 200 µl Initiator-1 to the mixture, immediately followed by the addition of 200 µl Initiator-2, mix well;
5. Add 2 g calcined HA and shake in the presence of a ceramic ball to mix;
6. Uptake the mixture in a 3 mL plastic syringe and allowed to gel at room temperature;
7. The resulting rubbery material is taken out of the syringe and cut into pieces (48Cal-2-AP); some are soaked in a large volume of water overnight before being freeze-dried (48Cal-2-FD) or further exchanged by glycerol (48Cal-2-Gly).

Preparing composite containing 48 w/w % calcined HA using Protocol 3:
1. Take 2 ml of HEMA and place in a scintillation vial;
2. Add 0.4 mL ethylene glycol and 0.75 mL water and mix well;
3. Add 40 µl EDGMA to the mixture, and mix well;
4. Add 100 µl Initiator-1 to the mixture, immediately followed by the addition of 100 µl Initiator-2, mix well;

5. Add 2 g calcined HA and shake in the presence of a ceramic ball to mix;
6. Uptake the mixture in a 3 mL plastic syringe and allowed to gel at room temperature;
7. The resulting rubbery material is taken out of the syringe and cut into pieces (48Cal-3-AP); some are soaked in a large volume of water overnight before being freeze-dried (48Cal-3-FD) or further exchanged by glycerol (48Cal-3-Gly).

Preparing composite containing 48 w/w % HA whisker using Protocol 1:
1. Take 2 ml of HEMA and place in a scintillation vial;
2. Add 1.1 mL ethylene glycol and mix well;
3. Add 40 µl EDGMA to the mixture, and mix well;
4. Add 200 µl Initiator-1 to the mixture, immediately followed by the addition of 200 µl Initiator-2, mix well;
5. Add 2 g HA whiskers and shake in the presence of a ceramic ball to mix;
6. Uptake the mixture in a 3 mL plastic syringe and allowed to gel at room temperature;
7. The resulting rubbery material is taken out of the syringe and cut into pieces (48whisker-1-AP); some are soaked in a large volume of water overnight before being freeze-dried (48whisker-1-FD) or further exchanged by glycerol (48whisker-1-Gly).

Preparing composite containing 48 w/w % HA whisker using Protocol 2:
1. Take 2 ml of HEMA and place in a scintillation vial;
2. Add 0.4 mL ethylene glycol and 0.75 mL water and mix well;
3. Add 40 µl EDGMA to the mixture, and mix well;
4. Add 200 µl Initiator-1 to the mixture, immediately followed by the addition of 200 µl Initiator-2, mix well;
5. Add 2 g HA whisker and shake in the presence of a ceramic ball to mix;
6. Uptake the mixture in a 3 mL plastic syringe and allowed to gel at room temperature;
7. The resulting rubbery material is taken out of the syringe and cut into pieces (48whisker-2-AP); some are soaked in a large volume of water overnight before being freeze-dried (48whisker-2-FD) or further exchanged by glycerol (48whisker-2-Gly).

Preparing composite containing 48 w/w % HA whisker using Protocol 3:
1. Take 2 ml of HEMA and place in a scintillation vial;
2. Add 0.4 mL ethylene glycol and 0.75 mL water and mix well;
3. Add 40 µl EDGMA to the mixture, and mix well;
4. Add 100 µl Initiator-1 to the mixture, immediately followed by the addition of 100 µl Initiator-2, mix well;
5. Add 2 g HA whisker and shake in the presence of a ceramic ball to mix;
6. Uptake the mixture in a 3 mL plastic syringe and allowed to gel at room temperature;
7. The resulting rubbery material is taken out of the syringe and cut into pieces (48whisker-3-AP); some are soaked in a large volume of water overnight before being freeze-dried (48whisker-3-FD) or further exchanged by glycerol (48whisker-3-Gly).

Preparation of pHEMA-Mo (5 vol/vol %) using Protocol 1:
1. Take 2 ml of HEMA and place in a scintillation vial;
2. Add 1.1 mL ethylene glycol and mix well;
3. Add 40 µl EDGMA to the mixture, and mix well;
4. Add 200 µl Initiator-1 to the mixture, immediately followed by the addition of 200 µl Initiator-2, mix well;
5. Add 1.9 g Mo and shake to mix;
6. Gelation occurred at room temperature.

Preparation of pHEMA-Mo (10 vol/vol %) using Protocol 1:
1. Take 2 ml of HEMA and place in a scintillation vial;
2. Add 1.1 mL ethylene glycol and mix well;
3. Add 40 µl EDGMA to the mixture, and mix well;
4. Add 200 µl Initiator-1 to the mixture, immediately followed by the addition of 200 µl Initiator-2, mix well;
5. Add 4 g Mo and shake to mix;
6. Gelation occurred at room temperature.

Preparation of pHEMA-Mo (20 vol/vol %) using Protocol 1:
1. Take 2 ml of HEMA and place in a scintillation vial;
2. Add 1.1 mL ethylene glycol and mix well;
3. Add 40 µl EDGMA to the mixture, and mix well;
4. Add 200 µl Initiator-1 to the mixture, immediately followed by the addition of 200 µl Initiator-2, mix well;
5. Add 9.1 g Mo and shake to mix;
6. Gelation occurred at room temperature.

Compression Test:
Standard unconfined compression tests were performed to evaluate the compressive behavior of the gels and the composites. Short cylindrical samples, nominally 3-4 mm in height and roughly 4 mm in diameter, were cut from the bulk material. Testing was performed in ambient air on a high-capacity MTS servo-hydraulic mechanical testing machine (MTS Systems Corporation, Eden Prairie, Minn.) fitted with stiff, non-deforming platens. The samples were loaded under displacement control at a rate of typically 0.015 mm/s, while the corresponding loads and displacements were continuously monitored using the in-built load cell and linear variable displacement transducer (LVDT). The resulting load-displacement data was analyzed to obtain compressive stress-strain plots. To characterize the reversibility of the compressive behavior of FlexBone samples at lower strains, loading and unloading were repeated 3-5 times on selected samples up to 40% compressive strain.

Microstructural Characterization:
The microstructure of the composites was characterized using environmental scanning electron microscopy (ESEM) using a Hitachi S-4300SEN microscope (Hitachi, Japan). The chamber pressure was kept between 30 to 100 Pa in order to avoid complete sample drying and surface charging during observation. The chemical composition was analyzed using energy dispersive spectroscopy (EDS) (Noran system SIX, Thermoelectron, USA) attached to the ESEM.

X-Ray Powder Diffraction (XRD):
The HA-pHEMA composites containing commercial HA powder, calcined HA or HA whiskers were evaluated by XRD with a Siemens D500 instrument using Cu Kα radiation.

Printing pHEMA-HA Composites into Complex Grids and 3-D Objects:
Prior to the solidification, the well-mixed HA-hydrogel cocktail was also used to explore the feasibility of 3-D printing of pHEMA-HA composites into computer designed objects and grids. The printing was performed using a robocasting machine (3D Inks, LLC, USA) with nozzle sizes ranging between 0.4 and 1.5 mm and printing velocities ranging from 1 to 10 mm/s.

Procedure for Polymerizing Hydrogels in the Presence of HA Suspensions (for Cytotoxicity Evaluations):
In a typical procedure, 200 mg of HEMA (in the case of anionic copolymers, 1-10% of them being the corresponding anionic amino acid-MA) was mixed with 2 wt % of crosslinker EGDMA and 50 µl of commercial polycrystalline HA suspension (100 mg/mL, sonicated prior to the experiment to break aggregates) along with ethylene glycol and radical initiators. The hydrogel-HA composites were allowed to form at room temperature overnight, before being thoroughly washed in Millipore water to remove excess amount of radical initiators for cell culture.

The present examples, methods, protocols, procedures, treatments, specific compounds and molecules are meant to exemplify and illustrate the invention and should in no way be seen as limiting the scope of the invention. While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method of forming a flexible composite, comprising:
   mixing an organic phase with an inorganic composition, the organic phase comprises a hydrogel monomer, a crosslinker, a radical initiator, and a solvent; wherein said inorganic composition is selected from the group consisting of crystalline hydroxyapatite (HA), nanocrystalline HA, amorphous HA, calcium phosphate, and substituted calcium phosphate, said substitution selected from the group consisting of F, Cl and Br;
   forming a polymerization mixture; and
   polymerizing the polymerization mixture into a desired shape and size to form the composite, wherein the polymerizing step occurs subsequent to the mixing step.

2. The method of claim 1, wherein the organic-to-inorganic ratio is about 1 w/w % to about 99 w/w %.

3. The method of claim 1 wherein the hydrogel monomer when polymerized has the following structure: STRUCTURE I: $-(CH_2-CR^2-COXR^1)_n-$, wherein $R^1$ is H or a lower alkyl, $R^2$ is H or a lower alkyl, X is O or NH or S, and n is 10 to 100,000.

4. The method of claim 1, wherein the crosslinker comprises a compound of STRUCTURE II, $R^3-C(CH_2)-CO-X-R^4-X-C(O)-C(CH_2)-R^{3'}$,
   wherein $R^3$ and $R^{3'}$ are independently H or a lower alkyl;
   wherein $R^4$ is $[-(CH_2)_n-Y[-(CH_2)_{n'}-]_m$, wherein n and n' are independently from 1 to 10 carbon atoms, m is 1 to 500,000, Y can be absent or O, S or NH, and X is O, S or NH heteroatom of O, S or N.

5. The method of claim 1, wherein the radical initiator is selected from the group consisting of benzophenone, 2,2-dimethoxy-2-phenylacetophenone (DMPAP), dimethoxyacetophenone, xanthone, thioxanthone, ammonium persulfate, sodium persulfite, sodium metasulfite, benzoylperoxide, potassium peroxodisulfate, ammonium peroxodisulfate, t-butyl hydroperoxide, 2,2'-azobisiobutyronitrile (AIBN), azobisiocyanobutyric acid, benzoyl peroxide-dimethylaniline, and ammonium peroxodisulfate-N,N,N',N'-tetramethylene-1,2-ethylenediamine.

6. The method of claim 1, wherein the solvent is water, ethylene glycol, or glycerol.

7. The method of claim 1, further comprising performing solvent exchange of the formed composite with ethylene glycol.

8. The method of claim 1, wherein the polymerizing is carried out by thermal initiation, photoinitiation, or redox initiation.

9. The method of claim 1, further comprising molding, sculpting, cutting, 3D-printing with computer assisted design, or stacking a plurality of composite pieces and applying adhesives.

10. The method of claim 1, wherein said inorganic composition comprises Ca, P and O.

11. The method of claim 10, wherein said inorganic composition has a ratio of Ca to P between 0.5 and 4.

12. The method of claim 11, wherein said inorganic composition has a ratio of Ca to P between 1 and 2.

13. The method of claim 1, wherein said composite is capable of sustaining a compressive strain of 90% and 700 MPa stress without fracturing.

* * * * *